Feb. 16, 1937.  M. F. L. A. AYMARD  2,071,223
CURRENT COLLECTOR MECHANISM FOR ELECTRICALLY PROPELLED VEHICLES
Filed Aug. 16, 1934  2 Sheets-Sheet 1
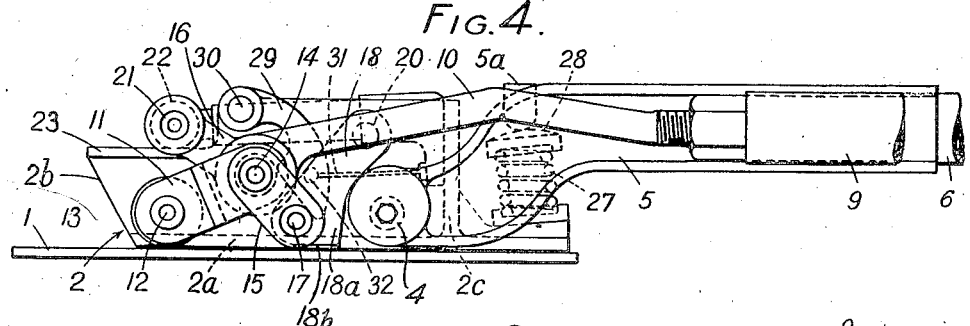
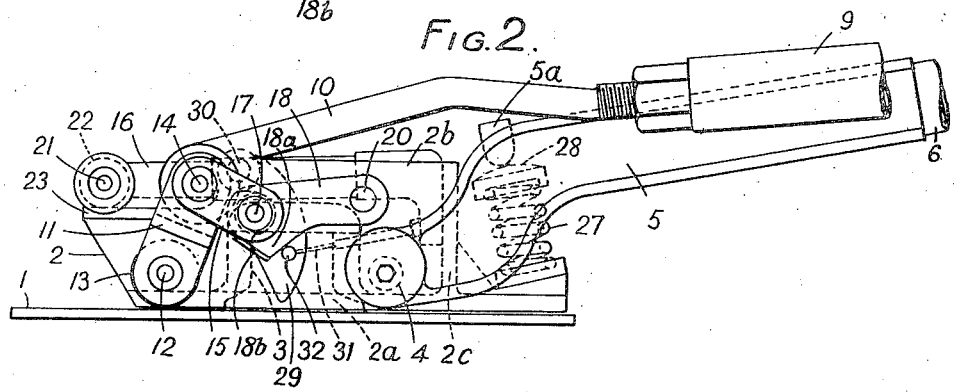
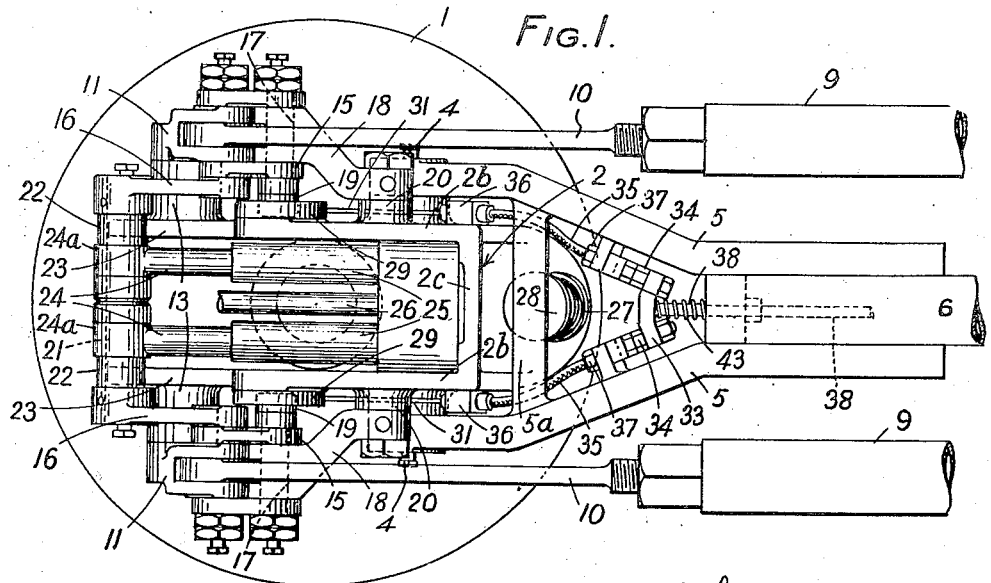
M. F. L. A. Aymard,
By Watson E. Coleman.

Feb. 16, 1937.  M. F. L. A. AYMARD  2,071,223
CURRENT COLLECTOR MECHANISM FOR ELECTRICALLY PROPELLED VEHICLES
Filed Aug. 16, 1934  2 Sheets-Sheet 2
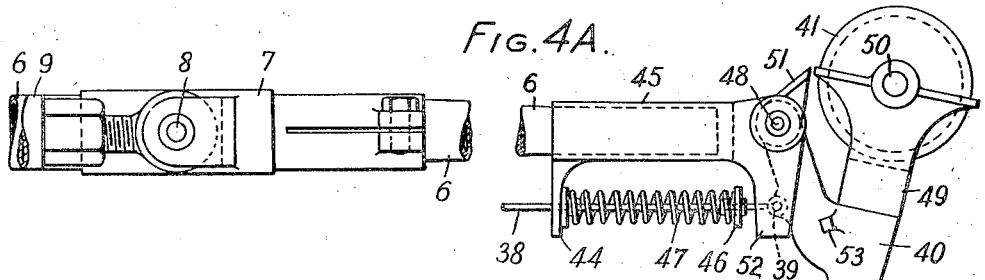
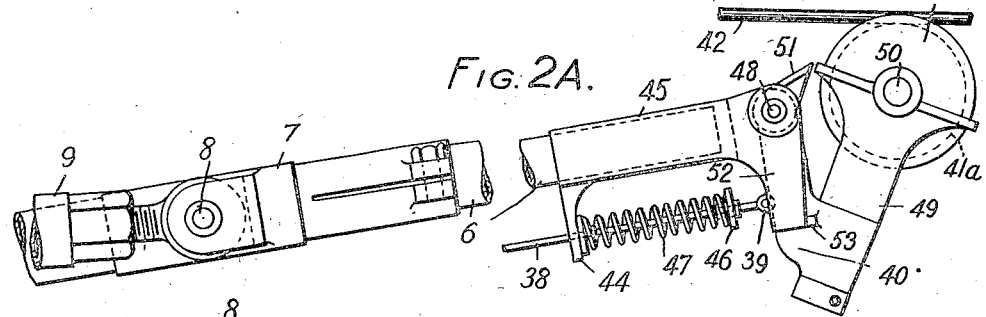
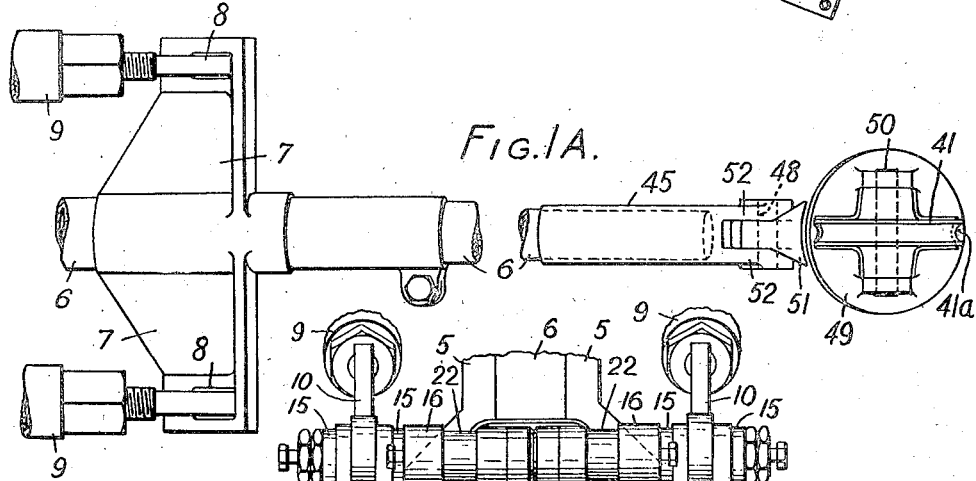

UNITED STATES PATENT OFFICE 2,071,223

CURRENT-COLLECTOR MECHANISM FOR ELECTRICALLY PROPELLED VEHICLES

Malcolm Foerster Lambe Aymé Aymard, Hove, England

Application August 16, 1934, Serial No. 740,165
In Great Britain August 19, 1933

13 Claims. (Cl. 191—89)

This invention relates to current-collector mechanism for electrically propelled vehicles operating on electric traction systems employing overhead wires.

Such collector mechanisms usually comprise a spring or springs for maintaining a boom carrying the collector proper, for example, a pulley, in contact with the overhead wire and the object of the present invention is to provide an improved form of current-collector mechanism of this character which shall be such that the collector proper will be lowered automatically upon its losing contact with the overhead wire for any reason.

Accordingly the invention provides a current-collector mechanism comprising a spring or springs for maintaining the collector proper in contact with the overhead wire, releasable means for normally maintaining the spring or springs operative and mechanism adapted to release said means upon the collector proper leaving the overhead wire to cause said spring or springs to become inoperative for maintaining the collector in an elevated position.

The boom-elevating springs, if two are used, may be permanently attached to the boom at one end and the other end of said spring normally held at a position such that the spring is operative for elevating the boom, by the means which are automatically released upon the collector leaving the overhead wire, or the one end of the spring or each spring may be permanently attached to a stationary member and the other end normally held in operative engagement with the boom by the said automatically releasable means.

Said automatically releasable means preferably comprise a hook or equivalent member connected by a suitable element to the mounting of the collector proper, which mounting is so disposed and arranged on the free end of the boom that it will move upwardly with respect to said end upon the collector proper leaving the overhead wire.

In order that the invention may be clearly understood, there follows a detailed description of the constructions of current-collector mechanism illustrated in the accompanying drawings, wherein:—

Fig. 1 is a plan view of the mechanism associated with the pivoted end of the boom in one construction, some parts being broken away, Fig. 1A is a similar view of the remainder of the boom, some parts being broken away, Fig. 2 is a side elevation of the mechanism shown in Fig. 1, the boom-elevating springs being operative, Fig. 2A is a corresponding view of the remainder of the boom, some parts being broken away, Fig. 3 is an end elevation taken from the left of Fig. 1, Fig. 4 is a view corresponding to Fig. 2 showing the boom-elevating springs in their inoperative position, Fig. 4A is a corresponding view of the remainder of the boom, and Fig. 5 is a diagrammatic side elevation of the mechanism associated with the pivoted end of the boom in another construction.

Referring first to Figs. 1 to 4:—

The current-collector mechanism comprises a base plate 1 adapted to be secured on the roof or top (not shown) of the electrically propelled vehicle to be supplied with current by means of said collector mechanism, and a cast frame (designated generally by 2) supported for horizontal rotation on an upstanding pivot 3 (Fig. 2) formed or provided on said base plate.

Said frame 2 is formed with a horizontal base portion 2a having a recessed part to constitute a cap for fitting over the pivot 3, a pair of parallel side walls 2b, 2b, and an end wall 2c connecting the rear ends of the side walls 2b.

Adjacent the rear ends of the walls 2b, and in proximity to the base plate 1, there are pivotally secured to said walls, at 4, the forward ends of the two limbs of a forked member 5 which is rigidly secured by its rear end to the forward end of a comparatively long boom 6. At a suitable point in its length this boom has secured thereon a transversely extending yoke 7 to each end of which is pivotally connected, as at 8, the rear end of a tension spring (not shown) enclosed in a telescopic spring casing 9, the other or forward end of each spring being connected by way of a cranked or off-set bar 10 to the upper end of a link 11.

As the further mechanism provided is duplicated on both sides of the longitudinal centre line of the frame 2, it is only necessary here to describe that disposed on one side of said centre line and this course will be adopted.

The link 11 is pivoted at its lower end on a pin 12 or the like engaged in the outer face of a boss 13 projecting laterally from the forward part of one of the walls 2b and has its upper end bifurcated to accommodate an eye formed on the end of the bar 10 (see Figs. 1 and 3). A comparatively long pivot pin or bolt 14 is passed through aligned apertures in the bifurcated upper end of the link 11 and the eye on the bar 10 and has engaged thereon the forward ends of a pair of link members 15 disposed one on each side of the link 11, a further link member 16 being also pivoted by its rear end on the pin or bolt 14 inside the innermost link member 15.

A further long pivot pin or bolt 17 is passed through aligned apertures formed in the rear ends of the link members 15 and in the forward end of a laterally cranked or off-set link 18, respectively, and is extended inwardly, towards the frame 2, to receive a freely rotatable roller 19 (Fig. 1). The rear end of the cranked link 18 is pivoted at 20 on the wall 2b at a point approximately vertically above the pivot 4 for the forked member 5.

The forward end of the link member 16 referred to above is pivotally engaged over one end of a transversely extending pin or the like 21 which carries, adjacent said link member, a rotatable guide roller 22 adapted to run on a guide rail 23 formed by the forward end of the upper edge of the wall 2b.

On the pivot pin 21, furthermore, there is mounted adjacent the roller 22 the apertured end 24a of a piston rod 24 adapted to work in a cylinder 25 which is rigidly mounted within the frame 2 adjacent one of the walls 2b thereof and, together with its counterpart on the opposite side of the longitudinal axis of the frame, is adapted to be supplied with fluid, say oil, under pressure through a common pipe 26, when desired.

At its rear end the base portion 2a of the frame 2 is extended beyond the wall 2c to form a support for the lower fixed end of a short compression spring 27, the upper end of which is secured in a cap 28 adapted to be contacted with by a cross bar 5a connecting the limbs of the fork member 5 to compress the spring when the boom 6 approaches the horizontal position, the spring 27 being shown fully expanded in Fig. 2 and somewhat compressed in Fig. 4.

Reference has been made above to the fact that the pivot pin 17 forming the join between the links 15 and 18, which constitute a toggle system, carries at its inner end a roller 19. As will be understood, the pull due to the boom-elevating springs (not shown) enclosed in the spring casings 9 tends to rotate the link 11 in a clockwise direction about the pivot 12 and thus to cause collapse of the toggle system 15, 18. This system is arranged to have a tendency to "break" or collapse downwardly, i. e. the pin 17 and roller 19 tend to move downwardly, and this tendency is normally prevented by a vertically disposed hook member 29 which is pivoted by its upper end at 30, on the wall 2b of the frame 2 so that its lower hooked end engages beneath the said roller 19.

Hence, while the hook member 29 is operative in preventing collapse of the toggle system 15, 18, the link 11 is maintained substantially vertically disposed and the springs (not shown) for elevating the boom 6 remain operative. When the hook member 29 is rendered inoperative, by means to be hereinafter described, the toggle system 15, 18 is rendered free to collapse and does so under the action of the pull of the boom-elevating springs, with the result that the parts 15, 18 and 11 assume the positions shown in Fig. 4 and the pivots 14, to which the forward ends of the boom-elevating springs are attached through the bars 10, will have moved in the direction of the pivot 4 for the boom. The amount of this movement is sufficient to render the boom-elevating springs inoperative for supporting the boom 6 in an elevated position and said boom therefore drops under the action of its own weight to the position shown in Fig. 4 where the spring 27 becomes operative as a cushioning stop to prevent damage to the mechanism.

This spring 27 also serves, during the normal operation of the current-collector mechanism, to exert additional upward pressure on the boom 6 when the latter is depressed excessively by the overhead wire, as when the vehicle is passing beneath low bridges or the like, in which circumstance the upward pressure exerted by the collector proper on the wire due to the boom-elevating springs alone is considerably reduced due to their line of action forming but a very small angle with the longitudinal axis of the boom.

The means for rendering the hook member 29 inoperative includes a length of sheathed flexible cable, the flexible cable 31 of which is connected at one end to the hook member 29 adjacent the lower end thereof, as at 32, and at the other end to a yoke member 33, as indicated at 34, and the sheath or casing 35 of which is secured at one end in a nipple 36 projecting laterally from the rear end of the appropriate wall 2b and at the other end in a nipple 37 secured on the inner face of the corresponding limb of the fork member 5 (see Fig. 1).

Centrally of the yoke member 33 is secured the forward end of a draw-rod or the like 38 which extends the full length of the boom 6 and is pivotally attached by its rear end at 39 to a mounting 40 carrying the collector proper which is shown as a circumferentially grooved pulley wheel 41 adapted to receive the overhead wire 42 (Fig. 2A) in its groove 41a. A light spring 43 is disposed around the rod 38 between the yoke member 33 and an abutment on the adjacent end of the boom 6 to ensure against unintentional movement of said yoke member in the direction for causing release of the hook members 29 and the said rod 38 is passed through a guiding aperture in a depending lug 44 formed on a tubular fitting 45 secured on the free end of the boom 6 on its way to the pivotal connection 39. Between said lug 44 and a collar 46 secured on the rod 38 adjacent the pivotal connection 39 there is disposed a comparatively strong compression spring 47, arranged around the rod 38, which tends to move said rod axially towards the right and thus to swing the mounting 40 upwardly about its pivotal connection 48 with the free end of the fitting 45.

So long as the collector pulley 41 is engaged with the overhead wire 42 under the action of the boom elevating springs contained within the spring casings 9, the mounting 40 is held depressed, in the position shown in Fig. 2A, and the spring 47 is compressed, the rod 38 being thus held against movement towards the right which would displace the yoke member 33 and the hook members 29 to the released position.

It will be seen that when the pulley 41 leaves the wire 42 for any reason the spring 47 will immediately become operative to cause the mounting 40 to swing upwardly about the pivot 48 and thereby impart longitudinal motion to the rod 38 in the direction for causing the hook members 29 to be withdrawn from engagement with the rollers 19 with the resultant collapse of the toggle systems 15, 18 and the lowering of the boom 6, as already described.

The mounting 40 is formed with a bearing at its lower end for the lower spindle-like end of a substantially vertical carrier 49 on the upper end of which the pulley 41 is rotatably mounted by means of a substantially horizontal spindle 50, the said upper end of the carrier 49 being widened to a disc-like head which is suitably slotted to accommodate the lower part of and permit rotation of the pulley 41. At its upper and pivoted end, the mounting 40 is formed with a widened nose or projection 51 which terminates in close proximity to the adjacent edge of the disc-like head of the carrier 49 and co-operates therewith in preventing overhead wires from entering into and becoming jammed in the gap between the mounting 40 and carrier 49.

Furthermore, the mounting 40 is disposed between two depending parts 52 of the forked end of the fitting 45 and is formed with a pair of laterally projecting stops 53, one on each side, adapted to contact with the parts 52 adjacent their lower ends to limit the extent to which the mounting 40 may swing downwardly about its pivot 48.

It will be seen from a consideration of Figs. 2 and 4 that the links 18 are formed with lateral extensions or heels 18a at the ends connected to the links 15. These heels 18a are each adapted to present a plane surface to the upper face of the base plate 1 which surface, when the toggle systems 15, 18 collapse, is adapted to bear on said plate with considerable pressure under the action of the boom-elevating springs. It is preferred to face the plane surfaces of said heels with a layer 18b of friction material so that the effect aimed at may be increased, namely, to produce a braking action tending to prevent rotation of the boom 6 and frame 2 about the pivot 3 relatively to the base plate 1 while the boom is in the lowered position.

Re-setting of the mechanism after it has operated to lower the boom as described above is readily effected by supplying fluid under pressure to the cylinders 25 to cause the piston rods 24 to move to the left in Fig. 4. This results in the pivot 21 being displaced to the left and exerting a pull on the ends of the bars 10, through the links 16, to return the boom-elevating springs to their normal condition and, at the same time, to straighten the toggle systems 15, 18. The collector pulley 41 is meanwhile directed into engagement with the overhead wire 42 by an attendant on the vehicle, for example, by means of a cord or the like attached to the mounting 40. As soon as such engagement is effected, the depression of the mounting 40 with respect to the free end of the boom 6 due to the upward pressure exerted on the latter by the boom-elevating springs overcoming the pressure due to the spring 47 causes the hooks 29 to be again moved to their operative positions in which they prevent the toggle systems from collapsing, whereupon the supply of fluid under pressure to the cylinders 25 is interrupted and the latter are allowed to discharge to a tank or the like at atmospheric pressure or to the open air.

In the modified construction, illustrated diagrammatically in Fig. 5, the mechanism to be associated with the free end of the boom 6 is substantially identical with that shown in Figs. 1A, 2A, and 4A and has not, therefore, been again illustrated.

The forward end of the boom 6 is, however, differently constructed and arranged, the boom proper being secured in the rear end of a substantially triangular frame member 54 which is disposed in a vertical plane and adapted to rock about a horizontal pivot 55 mounted in the rear end of a frame 56 having a vertical aperture 57 adapted to receive a vertical pivot (not shown) on a base plate secured on the vehicle roof.

As can be seen from the figure, the upper edge of the frame member 54 constitutes an extension of the boom proper and the pivot 55 engages that apex of the frame member disposed opposite said edge. At the forward end of the frame member there is secured a horizontal pivot 58 on which is mounted a link member 59 normally extending parallel with the upper edge of the frame member 54 and held in this position by the engagement of the hook 60, which is pivoted at 61 on the said frame member 54, beneath a pin 62 secured in the free end of said link member.

The boom-elevating spring, in this construction, comprises a tension spring 63 which is attached at one end to the forward end of the frame 56 and at the other end to the rear end of the link member 59. So long as the hook 60 remains in engagement with the pin 62 on the link member 59, the spring 63 tends to maintain the free end of the boom 6 in an elevated position, but upon release of the hook by the means described above acting through the draw-rod 38, the boom 6 is relieved of the action of the spring and falls under the action of its own weight.

A stop pin 64 is provided in the frame member 54 to prevent excessive movement of the link member 59 under the action of the spring 63 and also to facilitate the re-setting operation which is carried out by pulling a cord or like flexible member 65 which passes, in turn, around a guide pulley 66 arranged coaxially with the pivot 55, a guide pulley 67 rotatably mounted on the upper edge of the frame member 54, a guide pulley 68 rotatably mounted on the link member 59 and is finally secured to the member 54 at the point 69.

The action of pulling on the free end of the cord or the like 65, as will be understood, causes the link member 59 to be raised and, when the collector pulley has again been engaged with the overhead wire, the hook 60 again engages beneath the pin 62 to hold the spring in the operative position.

Although the means employed for normally holding the toggle systems 15, 18 against collapse in Figs. 1 to 4 and the free end of the link member 59 against movement downwardly with respect to the frame member 54 in Fig. 5, respectively, have been shown and described as pivoted hook or like members, it will be apparent that other members may be employed to produce the same results, such as, for example, a latch member guided for rectilinear movement on anti-friction rollers or the like, and I do not limit myself to the details of the constructions described and illustrated herein except as defined by the appended claims.

I claim:

1. Current-collector mechanism of the character described, comprising a collector, a boom, a mounting for said collector pivotally attached to said boom, spring means tending to swing said mounting about its pivot to cause the collector to move upwardly with respect to the boom, further spring means normally tending to urge the said boom upwardly so that the collector is applied to an overhead wire with sufficient pressure to overcome the action of said first-mentioned spring means, a connection from one end of said further spring means to the boom, a connection from the other end of said further spring means to an element capable of movement under the action of the said further spring means in a direction for rendering the latter inoperative for urging the boom upwardly, a retaining member normally holding said element against such movement in a position in which the further spring means are operative, and a connecting member extending from the mounting for the collector to the said retaining member and arranged so that upward movement of the collector relatively to the boom, such as occurs on the said collector leaving the overhead wire, will disengage the retaining member from the movable element and thus render the said further spring means inoperative, fluid-operated means for returning the said element to its normal position and means for supplying a fluid under pressure to said fluid-operated means when it is desired to return the said element and re-set the mechanism.

2. Current-collector mechanism as claimed in claim 1, wherein the movable element is adapted to be held in its normal position by means comprising a toggle system having a tendency to collapse under the action of the further spring means, the retaining member being normally engaged with said toggle system in a manner preventing such collapse thereof.

3. Current-collector mechanism of the character described, including a braking element adapted to become operative in preventing oscillation of the boom in a horizontal plane upon the boom-elevating spring means being rendered inoperative.

4. In a current-collector for trolleys, a base, a boom pivotally mounted upon the base for movement in a vertical plane and having a collector at its extremity, spring means pivotally connected to the boom rearward of the boom pivot and urging the rear end of the boom upward, vertically movable means operatively connected to the forward end of the spring means, means locking the movable means in a raised position with the forward end of the spring raised above the boom pivot to cause an upward pull on the boom, and means connected to and actuated by the upward movement of the collector with respect to the boom, due to the collector leaving the trolley wire, releasing the locking means to cause the movable member to drop and carry the forward end of the spring downward to a position where the spring will become inoperative and allow the boom to fall under its own weight.

5. In a current-collector for trolleys, a base, a boom pivotally mounted at its forward end upon the base for vertical movement and having a collector at its rear end, the collector being mounted upon the boom for vertical movement independent of the boom, a spring urging the collector upward relative to the boom, boom lifting means including a spring operatively connected at its rear end to the boom to urge it upward, a toggle link system mounted upon the base and operatively connected to the forward end of the boom lifting means, a latch normally holding the links of the toggle system approximately alined, with the rear end of the boom lifting spring raised above the boom pivot to cause an upward pull on the boom, and means operatively connecting said latch to the collector whereby as the collector moves upward relative to the extremity of the boom when the collector leaves the wire, the latch will be released to permit the toggle system to fall and the forward end of the spring means to move downward to a position where the spring will become inoperative.

6. A current-collector mechanism of the character described, including a boom pivotally mounted for vertical swinging movement, a collector, a mounting for said collector connected with the boom for vertical movement relative thereto, spring means urging the mounting upward, said means being compressed by contact of the collector with a trolley wire, spring means pivotally connected to the boom rearward of the boom pivot, extending across the pivot of the boom and mounted at its forward end for vertical swinging movement and normally disposed with its forward end above the pivotal center of the boom and urging the boom upward, means for latching the boom elevating spring means in a position with the forward end of the spring means disposed above the pivotal center of the boom, and means actuated by an upward movement of the collector mounting means relative to the boom and due to the collector leaving the trolley wire releasing said latching means to thereby permit the downward movement of the forward end of the spring towards the pivotal center of the boom to thus permit the downward movement of the boom under its own weight.

7. Current-collector mechanism of the character described, comprising a collector, a boom pivotally supported at its forward end, a mounting for said collector pivotally attached to said boom, spring means tending to swing said mounting upward about its pivot to cause the collector to move upwardly with respect to the boom, a second spring means extending longitudinally of the boom, operatively connected to the boom rearward of the boom pivot and normally tending to urge the boom upwardly so that the collector is applied to an overhead wire and is retained depressed relative to the end of the boom by said wire, a vertically movable element to which the other end of the said second named spring means is attached, releasable means maintaining the vertically movable element in a raised position such that the spring means are operative to urge the boom upward, and a connection from the mounting for the collector to the said releasable means so constructed and arranged that upward movement of the collector with respect to the boom, due to the collector leaving the wire, releases said releasable means.

8. Current-collector mechanism as claimed in claim 7, including fluid operated means for returning the said second named spring means to operative position after said means has been allowed to become inoperative by the operation of the releasable means.

9. In a current-collector for trolleys, a boom pivoted at its forward end for movement in a vertical plane, a collector mounted on the rear end of the boom for vertical movement independent of the boom, a spring urging the collector upward relative to the boom, the spring being normally held under tension by contact of the collector with the trolley wire, a boom elevating means extending across and forwardly above the pivot of the boom and including a contractile spring, a link pivotally supported at one end and at its other end pivotally connected to the forward end of the boom elevating means and supporting the forward end of the boom elevating means above the boom pivot with the spring exerting its force at an angle to the line of the boom to thereby lift the boom, a latch operatively engaging with and holding the free end of the link in a raised position relative to the boom pivot, and means actuated by the collector leaving the trolley wire and moving upward with respect to said boom, releasing the latch to permit the free end of the link to move downward and carry the boom elevating means in approximate alinement with the boom.

10. Current-collector mechanism of the character described, including a boom pivoted at its forward end for movement in a vertical plane, a collector mounted on the rear end of the boom for vertical movement independent of the boom, a spring urging the collector upward relative to the boom, the spring being normally held under tension and the collector against upward movement by the contact of the collector with the trolley wire, boom elevating means including a yoke attached to the boom rearward of its pivot and extending transversely of the boom, spring casings pivotally connected to said yoke and extending forward therefrom, connecting rods having their forward ends inserted within said spring casings and engaged with the springs therein and urged forward by said springs, said rods extending across the axis of the boom pivot and normally above said axis, a pair of links pivotally supported each at one end and each at its other end being pivotally connected to the forward end of one of said rods and normally supporting the rods above the axis of the boom pivot with the springs exerting their force at an angle to the line of the boom to thereby lift the boom, latching means operatively engaging with and holding the free ends of said links in a raised position relative to the axis of the boom pivot, and means actuated by the collector leaving the wire and moving upward relative to the boom to release the latch to permit the free ends of said links to move downward and carry the rear ends of said rods downward into approximate alinement with the boom.

11. In a current-collector mechanism, a base, a boom pivoted at its forward end to said base for movement in a vertical plane, a collector mounted on the rear end of the boom for vertical movement independent of the boom, a spring urging said collector upward and normally held under tension by contact of the collector with the trolley wire, a boom elevating means including connecting rods operatively pivoted at their rear ends to the boom rearward of the boom pivot, said rods normally extending across the axis of the boom pivot and above said axis, links each pivotally supported at its lower end upon said base and at its other end pivotally connected to one of said rods, means for latching said links in an upwardly extending position to thereby support the connecting rods in a position above the axis of the boom and supporting said rods at an angle to the length of the boom, latching means normally holding the free ends of the links in a raised position relative to the axis of the boom, and means actuated by the collector leaving the trolley wire and moving upward with respect to said boom releasing said latch means to thereby permit the forward ends of the links to move downward and carry said connecting rods into approximate alinement with the boom.

12. A current-collector mechanism, including a base, a boom pivoted at its forward end upon said base for movement in a vertical plane, a collector mounted on the rear end of the boom for vertical movement independent of the boom, a spring urging the collector upward, the spring being normally held under tension by contact of the collector with the trolley wire, boom elevating means extending longitudinally of the boom and across and normally above the pivot of the boom and including a contractile spring, a link pivotally supported at its lower end upon said base and at its other end pivotally connected to the forward end of the boom elevating means and supporting the forward end of the boom elevating means above the boom pivot with the spring exerting its force at an angle to the line of the boom to thereby lift the boom, a second link pivoted to the free end of the first named link, a third link pivoted to the adjacent end of the second named link, a latch operatively engaging said last named links to hold the links in approximate alinement with each other and thus hold the first named link in a raised position, and means actuated by the collector leaving the wire and moving upward with respect to said boom releasing said latch to permit the second and third named links to fold downward upon each other and thus permit the descent of the upper end of the first named link to thereby carry the forward end of the boom elevating means downward nearer to the boom pivot.

13. Current-collector mechanism of the character described, including a base, an element rotatable in a horizontal plane upon said base, a boom pivoted to said element, a collector carried by the boom and adapted to bear against a trolley wire, means normally urging the boom upward towards the trolley wire, means releasing said urging means automatically when the collector leaves the wire and permitting the boom to drop, and a braking member carried by said first named element and movable downward into frictional engagement with said base when the boom drops and acting to retard oscillation of the boom in a horizontal plane.

MALCOLM FOERSTER LAMBE AYMÉ AYMARD.